(12) United States Patent
Dasasathyan et al.

(10) Patent No.: US 7,735,039 B1
(45) Date of Patent: Jun. 8, 2010

(54) METHODS OF ESTIMATING NET DELAYS IN TILE-BASED PLD ARCHITECTURES

(75) Inventors: Srinivasan Dasasathyan, Santa Clara, CA (US); Hasan Arslan, Santa Clara, CA (US); Meng Lou, Markham (CA); Anirban Rahut, Sunnyvale, CA (US)

(73) Assignee: Xilinx, Inc., San Jose, CA (US)

( * ) Notice: Subject to any disclaimer, the term of this patent is extended or adjusted under 35 U.S.C. 154(b) by 429 days.

(21) Appl. No.: 11/895,899

(22) Filed: Aug. 28, 2007

(51) Int. Cl.
*G06F 17/50* (2006.01)
(52) U.S. Cl. .............................. 716/6; 716/16; 716/17
(58) Field of Classification Search .................... 716/6, 716/16, 17, 8–11
See application file for complete search history.

(56) References Cited

U.S. PATENT DOCUMENTS 6,919,736 B1 * 7/2005 Agrawal et al. ............... 326/41
7,185,299 B1 * 2/2007 Jayaraman .................... 716/6

OTHER PUBLICATIONS

Jorge Rubinstein et al.; "Signal Delay in *RC* Tree Networks"; Copyright 1983 IEEE; IEEE Transactions on Computer-Aided-Design; Jul. 1983; pp. 202-211.

\* cited by examiner

*Primary Examiner*—Sun J Lin
(74) *Attorney, Agent, or Firm*—Lois D. Cartier

(57) ABSTRACT

Methods of estimating delays between pins on a tile-based programmable logic device (PLD), by identifying repeat patterns and exploiting these patterns to provide accurate delay estimates. A computer-implemented method can include selecting a sample area in a tile-based PLD and constructing a delay table corresponding to the sample area. Each entry in the delay table includes a base delay value and a description of the fastest available route from a source pin in a source tile to a load pin in the sample area. To estimate a net delay, the base delay value and the description of the route are read from the delay table for specified source and load pins. One or more delay variants (e.g., pin delays and/or crossing penalties) are calculated based on the description of the route. The calculated delay variants are added to the base delay value to obtain an adjusted delay value, which is output.

20 Claims, 5 Drawing Sheets

FIG. 1
(Prior Art)

METHODS OF ESTIMATING NET DELAYS IN TILE-BASED PLD ARCHITECTURES

FIELD OF THE INVENTION

The invention relates to programmable logic devices (PLDs). More particularly, the invention relates to methods of estimating net delays when implementing a user design in a PLD.

BACKGROUND

Programmable logic devices (PLDs) are a well-known type of integrated circuit that can be programmed to perform specified logic functions. One type of PLD, the field programmable gate array (FPGA), typically includes an array of programmable tiles. These programmable tiles can include, for example, input/output blocks (IOBs), configurable logic blocks (CLBs), dedicated random access memory blocks (BRAM), multipliers, digital signal processing blocks (DSPs), processors, clock managers, delay lock loops (DLLs), interconnect lines (wires) and programmable interconnection points (PIPs), and so forth.

The programmable tiles are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

Figure 1:
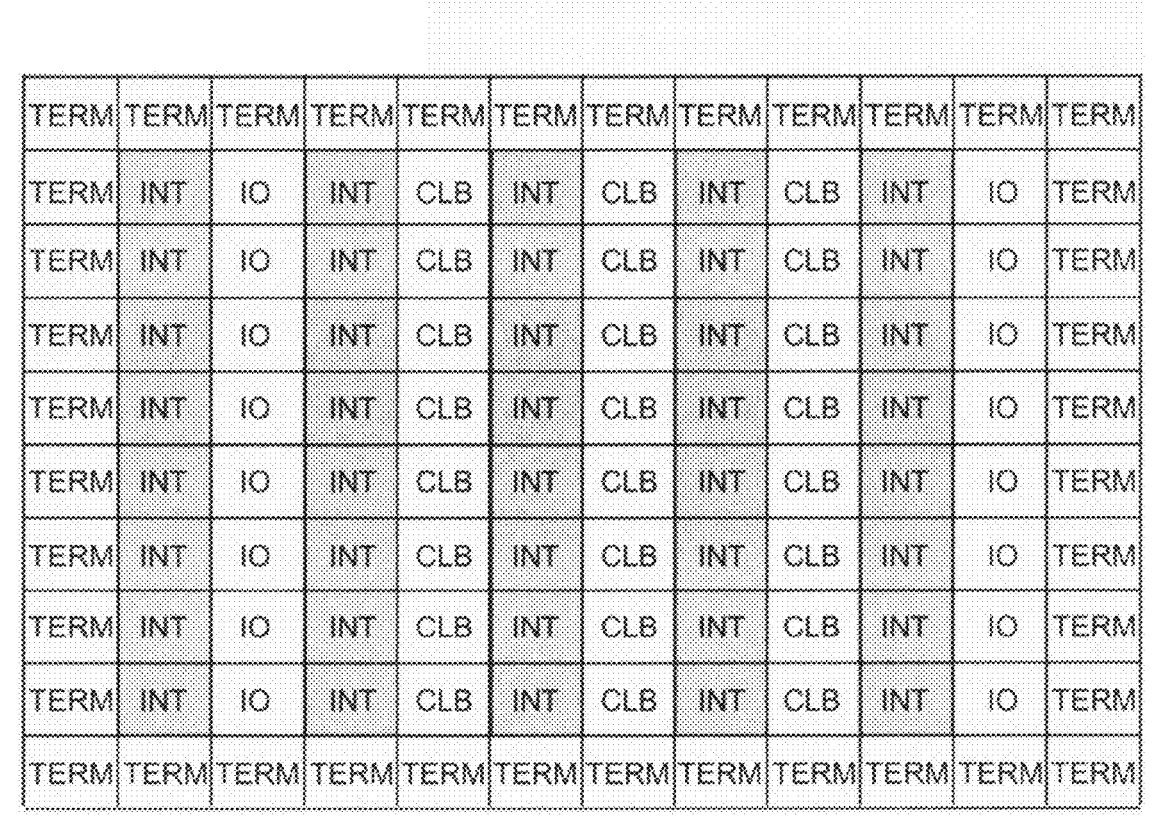

FIG. 1 is a simplified illustration of an exemplary PLD, e.g., the Virtex®-4 FPGA available from Xilinx, Inc. The PLD of FIG. 1 includes columns of logic tiles including configurable logic blocks (CLBs) and input/output blocks (IOBs), and programmable interconnect tiles (INTs) that are used to programmably interconnect the logic tiles. Surrounding the array are terminating tiles (TERMs). In the pictured embodiment, the interconnect tiles are identical to one another. This uniformity makes the architecture more amenable to change, and also easier to maintain. Additionally, this approach reduces the design time for a PLD, because design teams designing logic tiles can assume that the connectivity of the interconnect tiles feeding the logic tiles is fixed. Thus, for example, some PLDs also include additional logic tiles with special purposes (not shown), e.g., DLLs, block RAM, and so forth. In the Virtex-4 FPGA, these additional logic tiles also use the same interconnect tiles as the CLBs and IOBs.

Interconnect tiles in the Virtex-4 device include two types of connectivity. One type is the connectivity across tiles, which includes "doubles" (wires two tiles long), "hexes" (wires six tiles long), and "longs" (wires 24 tiles long), for example. The other type is the connectivity to the logical pins of the adjacent logic tile, which can include, for example, connections to input multiplexers and output multiplexers of the logic tile.

Some FPGAs do not use the same interconnect tile for all logic tile types. For example, it may be more area efficient to customize the interconnect tile for each type of logic tile, by only including the connectivity required by that type of logic tile. While this approach may save die area, it also requires more design hours and reduces the symmetry of the FPGA, which may have a negative impact on the efficiency of the FPGA implementation software.

FPGA implementation software typically includes a mapper (which maps the user logic to programmable elements of the FPGA), a placer (which places the mapped elements into logic tiles on the FPGA), and a router (which routes signals between the logic tiles using the interconnect tiles). The tools may also include a physical synthesis tool, which inputs a user design and outputs a netlist representation of the design, suitable for mapping. Each of these software tools can provide a better result (e.g., a design implementation with a faster operating frequency) if provided with accurate timing delays for the various elements of the FPGA.

While worst-case timing delays for each net can be calculated using specified delay values for every individual component of the net, such calculations can be very expensive in terms of computing time and power. Therefore, it is desirable to provide methods of accurately estimating timing delays in a PLD that can be used, for example, when implementing a user design in the PLD.

SUMMARY

The invention provides methods of estimating delays between pins on a tile-based programmable logic device (PLD). These methods identify repeat patterns in a tile-based PLD and exploit these patterns to provide accurate delay estimates. According to one embodiment, a computer-implemented method includes selecting a sample area in a tile-based PLD and constructing a delay table corresponding to the sample area. Each entry in the delay table includes a corresponding base delay value and a corresponding description of a route (e.g., the fastest available route) from a source pin in a source tile to a load pin in the first sample area. To estimate a net delay, the base delay value and the description of the route are read from the delay table for a specified source pin in the source tile and load pin in the sample area. One or more delay variants are then calculated based on the description of the route read from the delay table. The delay variants can include, for example, pin delays and wire variants, e.g., crossing penalties due to crossing unusually large and/or dense logic tiles. The calculated delay variants are added to the base delay value read from the delay table to obtain an adjusted delay value, and the adjusted delay value is output as the estimated net delay.

In some embodiments, four different delay tables are provided, with the four delay tables covering sample areas that extend substantially in different directions (e.g., orthogonal directions) from the source tile.

The invention also provides computer systems for executing these methods. Yet another embodiment of the present invention can include a computer program product including a computer-usable medium having computer-usable program code that, when executed by an information processing system, causes the information processing system to perform the various steps and/or functions disclosed herein.

BRIEF DESCRIPTION OF THE DRAWINGS

The present invention is illustrated by way of example, and not by way of limitation, in the following figures.

FIG. 1 is a simplified illustration of an exemplary tile-based programmable logic device (PLD).

DETAILED DESCRIPTION OF THE DRAWINGS

Figure 2:
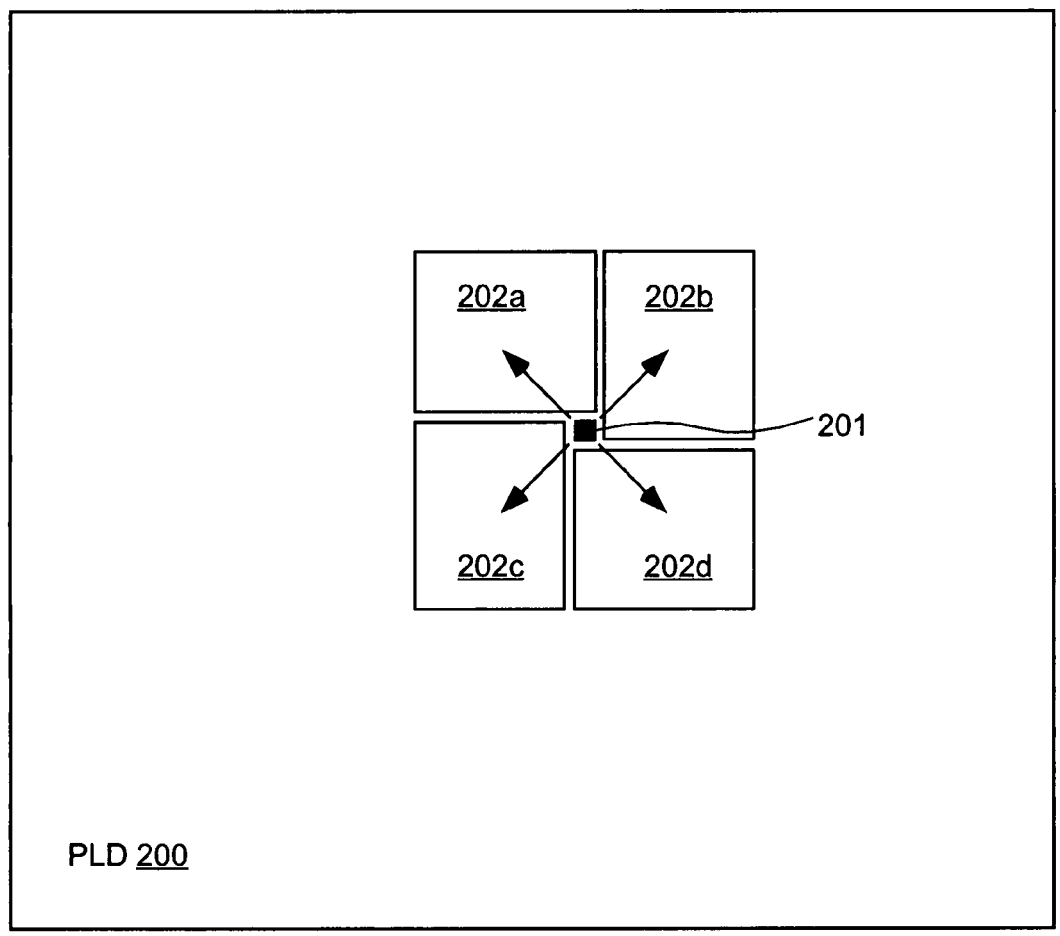
FIG. 2 illustrates four representative sample areas that can be used to estimate pin-to-pin delays in a PLD.

The present invention is applicable to a variety of programmable logic devices (PLDs). The present invention has been found to be particularly applicable and beneficial for field programmable gate arrays (FPGAs). Therefore, an appreciation of the present invention is presented by way of specific examples utilizing FPGAs. However, the present invention is not limited by these examples, and can be applied to virtually any tile-based PLD in which the routing is implemented using repeated iterations of a single routing tile.

As described above, delay estimates may be used by a variety of PLD implementation tools, such as synthesis, mapping, placement, and/or routing tools. The delay estimates are used in heuristics, for example, when performing a timing-driven place-and-route process. For example, in the Xilinx ISE development system tools, the placer uses the delay estimates of the signals in a design to guide the placement of logic elements on the target FPGA. If a signal has a high delay estimate, the signal is likely to end up as a critical signal during the routing process, and therefore the placer attempts to shorten the connection by placing the source and load logic elements in the same tile, or in tiles located more closely to one another. Placement software may make millions of calls to a delay estimator during the placement of a single user design. Therefore, the estimation process should be as accurate and fast as possible.

Delay estimation is often performed by creating a Steiner tree for a signal, and then estimating the amount of RC delay that is observed on such a network. Another known approach is to estimate the delay based on the Manhattan distance between the pins of the PLD. Other approaches have also been used, such as using a minimum spanning tree. However, some of these approaches are slow, and it is impractical to call them millions of times. Therefore, known FPGA implementation software, for example, typically uses the Manhattan distance between pins (endpoints of a net) to estimate the delay of the net. This method is relatively accurate, because routing in an FPGA typically runs in the vertical and horizontal directions. Further, state-of-the-art FPGAs are fully buffered, so there is minimal impact of the side branch effect.

However, an important goal for a delay estimator is to estimate the delays as the router would see the delays. If the delay estimate in the placer is accurate to the actual routed delay in the router, then the placer and router are in synch, and will have the same picture of criticality for the design. However, such a correspondence is very difficult to fully realize using known methods, without completely routing a net each time a move is made by the placer. Such a practice would dramatically increase the time and resources required to implement a user design.

Another factor that influences delay estimation strategy is the availability of routing resources in the PLD. Steiner trees may provide a good estimation strategy when the router has relatively limited routing resources available, because under these circumstances minimizing the use of routing resources is as important a goal as timing optimization. However, today's PLDs typically have sufficient routing to ensure that even complex designs can route and achieve high performance. In essence, performance considerations have eclipsed area requirements in PLDs. When routing resources are numerous and performance is paramount, a router will now typically select a star topology for routing critical connections. In a star topology, instead of sharing wires with an existing route, critical nets will typically branch out from the source pin. In other words, a critical pin on a net is routed oblivious to the presence of other pins on the net. Because side branching is not much of a contributing factor in today's PLDs, due to the presence of full buffering, the delay of such a route is only determined by the delay of the fastest route between the source and the load pin.

Thus, a signal delay may be estimated as an approximation of the fastest delay between the source and load pins. Therefore, in order to quickly and accurately estimate the delay of a net, it is desirable to have a method of quickly finding the fastest delay between any two pins on the PLD. The present invention provides such methods.

FPGAs in general have a hierarchical routing structure, meaning that they include wiring having a repetitive pattern, but spanning different numbers of tiles. For example, as previously noted, the Xilinx Virtex-4 FPGA includes "doubles" (wires two tiles long), "hexes" (wires six tiles long), and "longs" (wires 24 tiles long). Not all of these wire types have programmable interconnections. For example, a long may connect to one or more hexes, which in turn connect to doubles. Doubles in turn connect to the source and load pins. Therefore, in order to route from an output pin (a source pin) to an input pin (a load pin) via a long interconnect line, for example, the output pin first connects to a double, which connects to a hex, which in turn drives a long. The long line may then drive another hex, which drives another double, and then, finally, the double drives the input pin.

Further, the number of wires of each type is different. For example, there are more doubles than hexes, and more hexes than longs. This level of complexity makes it a complicated procedure to determine the fastest possible way to reach from a source pin to a load pin. Therefore, the present invention provides a method of estimating the delays of the various possible routes, thus facilitating the relatively rapid determination of the best implementation for a user design in the PLD.

Clearly, it would be prohibitively expensive, both in terms of compute time and memory, to compute the fastest delay between every pair of pins on an entire PLD. Therefore, the methods of the invention utilize a representative sample of the PLD (the "sample area"), and maze route the sample area to determine the delays between all source pins and load pins in this area. The size of the sample area may be selected, for example, to include all routes that can be accommodated using the standard routing patterns followed by the router. Only one interconnect tile (the "source tile") is used as a potential source. The fastest delay is then computed between all pins in the source tile and all load pins in the sample area. This technique is successful because all interconnect tiles are the same. Thus, any source-load pin pair on the PLD can be mapped onto this sample area, providing that the size of the resulting net is less than the size of the sample area.

In some embodiments, directionality and orientation are important factors in determining delay. Thus, four different representative samples are used, one to the northwest, one to the northeast, one to the southwest, and one to the southeast of the source tile. A table of delays is created for each of the representative samples, e.g., four tables, as shown in FIG. 2. Note that the tables need not be rectangular as in the representation of FIG. 2. The shapes and sizes of the table(s) may vary, for example, according to the characteristics of the PLD architecture, e.g., the interconnect tiles. For example, in some embodiments the tables include information based on "Manhattan distance", or the sum of offsets in the X and Y directions. For example, a sample area may include all load tiles within a Manhattan distance of 24 from the source tile. In the embodiment of FIG. 2, the sample area is a rectangular area encompassing 24×24 interconnect tiles.

Note also that the number of tables may be other than four, such as one, two, three, or five or more, as desired.

In FIG. 2, a PLD 200 includes a source tile 201. Sample areas 202a-202d are represented by four directional tables including delay values for source-to-load delays, with the source being located in the source tile 201, and the load being located within the associated sample area 202a-202d.

In some embodiments, each delay table is encoded in binary format. The table generation is typically done prior to implementation of the user design, e.g., when the delay estimation software package is built. The binary files are then shipped along with the PLD implementation software. During the actual invocation of the implementation software, the delay estimation software loads an associated delay table into memory for each net, and does a lookup into the table to retrieve the delay for source and load pins having a given locational relationship. This lookup provides an approximation of the fastest delay between pins at those locations, which in turn provides a relatively accurate estimation of the net delay between the source and load pins, compared to the estimates provided by known methods.

An exemplary entry in a delay table includes an identifier for the source pin within the source tile, an identifier for the load pin within the load tile, location information for the source pin in the source tile, location information for the load pin in the load tile, a relative displacement between the two tiles (e.g., values for $\Delta X$ and $\Delta Y$, measured in interconnect tiles), a base delay, and a description of the relative route between the source and load pins. (The description of the relative route is needed for calculating crossing penalties, as described below.) For example, an entry in a delay table may appear as follows, where VUNIHEX_VarN is a wire variant of HUNIHEX:

Clb_X6Y27, SLICEL0.X (source)
        Clb_X19Y37.SLICEM0.F1 (load)
    $\Delta X=12$, $\Delta Y=10$
    Route={OUTPUT_Var1, VUNIHEX_Var1, HUNIHEX_Var1, HUNIHEX_Var1, VUNIHEX_Var2, DOUBLE_Var2, INPUT_Var1}
    Delay=1237 ps.

In this delay table entry, the specified source and load pins are located 12 interconnect tiles apart in the horizontal (X) direction, and 10 interconnect tiles apart in the vertical (Y) direction. The locations of the source and load pins in the logic tiles associated with the source and load interconnect tiles are specified. (In this example, the source pin is the "x" output of the "L0" slice of the "X6Y27" CLB, and the load pin is the "F1" input to the "M0" slice of the "X19Y27" CLB.) The description of the route specifies seven different wires programmably coupled together in series: a line from the source pin (OUTPUT_Var1 of the source CLB), a vertical hex line (VUNIHEX_Var1), two horizontal hex lines (HUNIHEX_Var1), another vertical hex line (VUNIHEX_Var2), a double interconnect line (DOUBLE_Var2), and a line (INPUT_Var1) to the load pin of the load CLB. The total base delay for this route is 1237 picoseconds (ps). In the exemplary embodiment, this delay can be included in the delay table, because $\Delta X$ and $\Delta Y$ are each less than 24, and a rectangular area of 24×24 tiles is covered by the table.

The estimation process can be improved by taking into account certain other factors ("delay variants", or adjustments to the base delay), resulting in a more accurate approximation of the fastest source-to-load delay. Delay variants can include, for example, pin delays and wire variants. Calculated values for pin delays and/or wire variants can be added to the base delay values obtained from the delay table, to provide a more accurate delay estimate.

Pin delays can often differ between the various pins in a PLD tile. Such a pin delay can be considered as a lumped delay on the pin. Often, this lumped delay is a modeling artifact, as some of the logic delay of the logic tiles is pushed onto the pins (e.g., to equalize the logic delays between all input and output pins of the logic tile). Further, the pin delay for an interconnect tile may vary based on whether the associated logic tile is a CLB, and IOB, a BRAM, a DSP tile, and so forth. However, the values in the delay tables must be independent of the nature of the associated logic tiles.

The table-based delay estimation process can be adapted to handle these variable pin delays, by removing the effects of the lumped pin delays from the values stored in the delay tables. The pin delay of each of the source and load pins is simply subtracted from the net delays before storing the values in the table. This step ensures that the table stores the simple routing delay (base delay), without taking into consideration the impact of pin delays. At actual estimation time, the delay estimate needs to include the pin delays, so the pin delays are added back to the lookup values before the delay estimation is provided, e.g., to the placement software.

Wire variants can also be taken into account in order to improve the accuracy of the delay estimation process. When building the tables, the routes may be stored along with the delays, as in the exemplary delay table entry shown above. In other words, not only the delays are stored, but also the fastest route for each net, from source to load pin. There may be many routes having the same fastest delay, in which case only one of the routes is selected.

The delay estimation software utilizes multiple aspects of a wire; e.g., the signature, the base delay, and any wire-based delay variants that may be applied to the base delay.

A "route" in a PLD is an ordered list of wire types. Each wire type is represented by a unique "signature". The signature may be composed, for example, of the wire type name (e.g., DOUBLE, HEX), the total length of the wire, the location of the entry PIP on the wire, and the location of the exit PIP from the wire. If two wires have different delay models in the hardware, they are given different signatures. The various wire signatures may be stored, for example, in a signature file provided with the delay estimation software.

Figure 3:
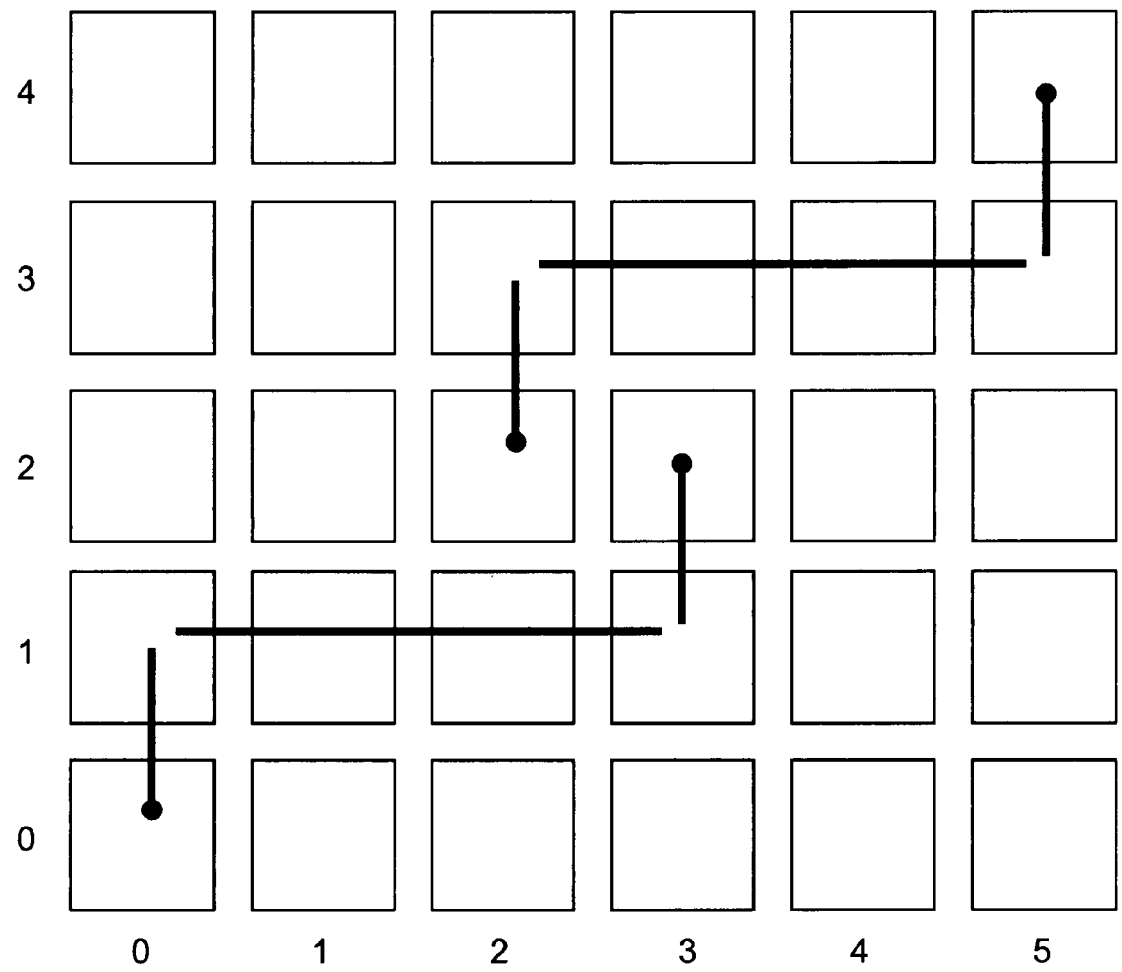
FIG. 3 illustrates two routes that may be accommodated, for example, by a single entry in a delay table for a sample area such as the sample areas of FIG. 2.

FIG. 3 illustrates two routes that may be, accommodated by a single entry in the delay table. Because the PLD is symmetric and the interconnect tiles are similar throughout, a fastest routing pattern at a certain location of the PLD translates seamlessly when the source and load pins move in the X direction (horizontally in FIG. 3) and/or the Y direction (vertically in FIG. 3), keeping the pin types and the offsets the same. For example, the two routes shown in FIG. 3 have the same pin types and offsets. The route from location (0,0) to (3,2) seamlessly translates with the same routing pattern onto the route from location (2,2) to (5,4). Thus, both of these routes have not only the same signature, but also the same base delay, which is the delay of the route without taking into account such factors as pin delays and wire variants.

The delay models of wires and PIPs are typically provided as a combination of resistances (R) and capacitances (C). In order to arrive at wire delays based, on such resistances and capacitances, the Penfield-Rubinstein model of RC computation can be used, for example. This model was described by Rubinstein, Penfield, and Horowitz in a paper entitled "Signal Delay in RC Tree Networks", published by IEEE Transactions on Computer-Aided Design, July 1983, which is hereby incorporated herein by reference.

However, computing the RC delays each time by building up an RC network is prohibitively expensive in terms of computation time. A better approach is to pre-compute the base delays and the wire variants from the RC model and store them in a table. During estimation, for example, crossing penalties can be retrieved from the table for the specific route, and then added to the base delay values to provide an adjusted delay estimate. (Crossing penalties are additional delays incurred by crossing over discontinuities such as larger and/or denser logic tiles inserted into the regular tile-based array, as in some advanced tile-based PLDs. Crossing penalties are described in detail below.) This lookup table based approach can best be applied when all wires are fully buffered, as in the Virtex-4 FPGA from Xilinx, Inc.

Note that this method of handling wire variants is similar to the approach described above for pin delays. In both cases, the delays stored in the delay table are base delays, with pin delays/wire variants being added as needed for a particular route. The motivation is also similar: to ensure that the values stored in the delay tables are independent of the nature of the associated logic tiles, such as large tiles intruding into the array. Thus, in the case of crossing penalties, the values in the delay table are independent of the relative locations of the source tile, the load tile, and the intrusive tiles. Thus, even when the logic tiles are not homogeneous with the PLD, the delay table can still be used to accurately approximate delays in the PLD.

The number of wires and PIPs in a PLD such as the Virtex-4 FPGA is typically in the millions. Therefore, it is not feasible to keep a table entry for each wire or PIP. However, the overhead can be reduced by grouping all wires that have the same delay characteristics into a single group, and giving the group the same signature. By using this grouping method, the number of delay values (lookup table entries) needed to describe the routing delays can be reduced by a factor of one thousand, in some embodiments, or even more.

Figure 4:
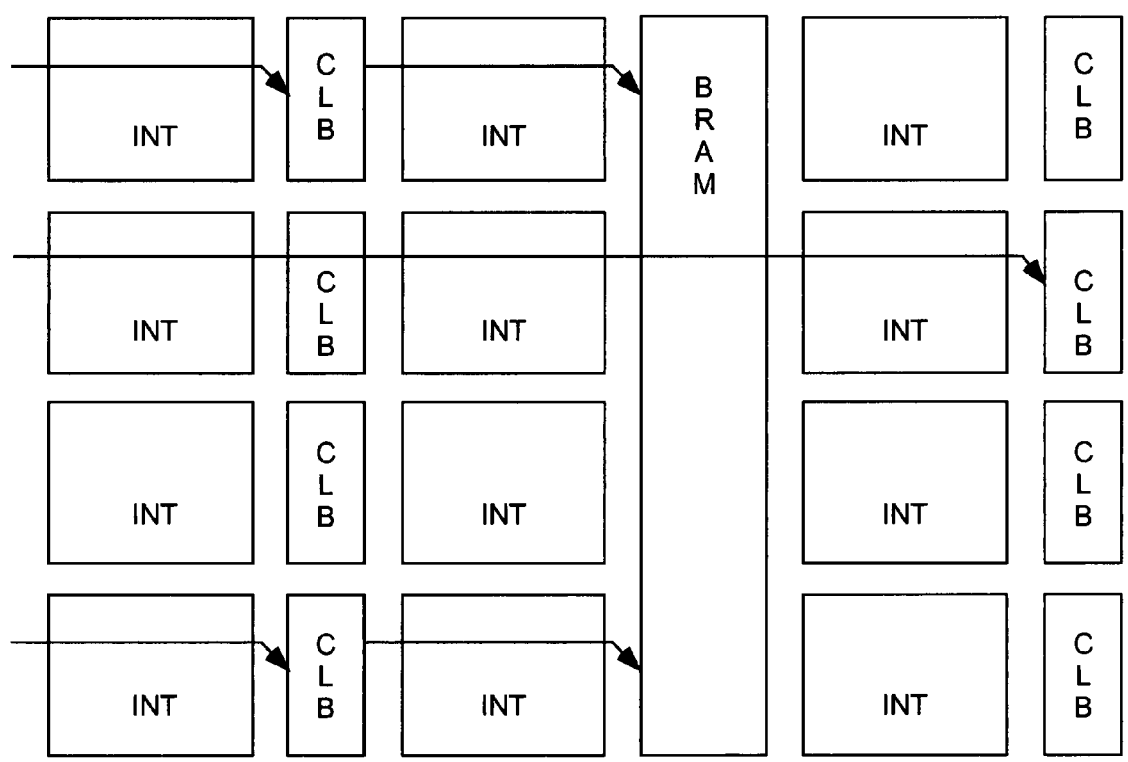
FIG. 4 illustrates a PLD that includes non-homogeneous logic blocks having increased size and density, and how crossing penalties may occur in such PLDs.

As described above, crossing penalties are additional wiring delays incurred by the wire crossing over an intrusion in the regular array. For example, FIG. 4 illustrates an FPGA including multiple columns of CLBs (CLB) separated by columns of interconnect tiles (INT). In addition to CLBs and interconnect tiles, the FPGA of FIG. 4 includes a large block RAM (BRAM) tile, which vertically spans four interconnect tiles, and is also larger in the horizontal direction than a CLB tile in the pictured embodiment. Because of the increased size and density of the BRAM tile relative to the CLB tile, the capacitance of a wire crossing a BRAM tile is larger than the capacitance of a similar wire crossing a CLB tile. This increased capacitance increases the delay of a wire crossing the BRAM tile, relative to a similar wire crossing a CLB tile. Such an increase in delay can potentially contradict the premise that the fastest routes on a PLD translate seamlessly when the route is moved horizontally and/or vertically by an integral number of interconnect tiles, but the pin types remain the same.

Whether or not a route which originally passed over only CLB tiles will cross over a larger and/or denser tile such as a BRAM when translated (moved horizontally and/or vertically) depends on the location of the pins and the floorplan of the PLD. Experimental results have shown that crossing penalties are generally small (e.g., on the order of 10-100 picoseconds) and therefore the translated route often is still close to the fastest route. Therefore, in some embodiments this effect is disregarded. Preferably, however, the delay estimation software takes into account the correct values of the crossing penalties of the various wires, by storing the crossing penalties as wire variants of the base delay.

Note that a single wire can potentially cross multiple large and/or dense tiles, and these multiple tiles are accounted for by multiple wire variants. Another factor that can affect the delay estimation is the location (e.g., the offset from the source tile) at which the large and/or dense tiles are crossed. For example, consider the case of a hex wire with a signature "HUNIHEX_Var1". This signature may be given, for example, to a horizontal unidirectional hex wire in the Xilinx Virtex-4 FPGA. The following signature may be used, for example, to denote a horizontal unidirectional hex wire that traverses six logic tiles in the X direction, and zero logic tiles in the Y direction.

Signature HUNIHEX_Var1→203
[BRAM 5 0] [IO 0 0]→58
[BRAM 4 0]→27
[BRAM 3 0]→27
[BRAM 2 0]→27
[BRAM 1 0]→27
[BRAM 0 0] [DSP 5 0]→70
[DSP 4 0]→39
[DSP 3 0]→39
[DSP 2 0]→40
[DSP 1 0]→40

There are three tap points on this exemplary wire, at the logic tile positions (0,0), (3,0), and (6,0). (The logic tile positions are given as offsets from the source tile, with each tile index indicating one interconnect tile plus the associated logic tile.) The base delay of the wire is 203 ps (picoseconds). As previously noted, the base delay assumes that the hex wire does not cross any large or dense blocks, e.g., all logic blocks crossed by the hex wire are CLBs. When this wire crosses a BRAM tile at location (5,0) and an IOB at location (0,0), the crossing penalty is 58 ps. When the wire crosses a BRAM tile at location (0,0) and a DSP tile at location (5,0), the crossing penalty is 70 ps. When the wire crosses only a single BRAM at (4,0), the penalty is 27 ps. The crossing penalty for a DSP tile depends on the location of the DSP tile along the HEX wire.

Consider once again the delay table entry described above:
Clb_X6Y27,SLICEL0.X (source)
Clb_X19Y37.SLICEM0.F1 (load)
ΔX=12, ΔY=10
Route={OUTPUT_Var1, VUNIHEX_Var1, HUNIHEX_Var1, HUNIHEX_Var1, VUNIHEX_Var2, DOUBLE_Var2, INPUT_Var1}
Delay=1237 ps.

To compute the total delay variants for this delay table entry, assume arbitrarily that the only non-homogeneous logic tile encountered any of the seven wires in this net is a block RAM (BRAM) at location X10Y33. This BRAM tile is crossed by the HUNIHEX_Var1 wire at an offset (4,0) from the source pin. Looking up the crossing penalty from the HUNIHEX_Var1 signature given above, the wire variant is 27 ps. Assuming that the pin delays of the X and F1 pins are 0 and 100 ps, respectively, the total estimated delay for the net is the base delay plus the pin delays plus the crossing penalty, or 1237+0+100+27=1364 ps.

To reduce runtime for the delay estimation software, in some embodiments the signature includes additional information that can be used to rapidly detect when a wire crosses a non-homogeneous block. For example, when a wire signature is created, a universal set of coordinates of potential non-homogeneous tile crossings may be stored along with the base delay and applicable crossing penalties. For each potential crossing coordinate, a list of potential non-homogeneous tile crossings relevant to that coordinate is included. For example, for the HUNIHEX_Var1 wire described above, the universal set of crossing coordinates is {(0,0), (1,0), (2,0), (3,0), (4,0), (5,0)}. The offset-to-block map is as follows:

(0,0)→BRAM, IO
(1,0)→BRAM, DSP
(2,0)→BRAM, DSP
(3,0)→BRAM, DSP
(4,0)→BRAM, DSP
(5,0)→BRAM, DSP

Instead of having to search a description of the PLD for crossings for this wire, it is only necessary to traverse the above coordinates from the source tile and check if the corresponding logic tile types exist. In other words, to discover if a HUNIHEX_Var1 wire crosses a non-homogeneous tile at the (0,0) position, simply search the above offset-to-block map and look for either a BRAM or an IO tile at coordinates (0,0). If any other tile (e.g., a DSP tile) is found at (0,0), it is not an applicable crossing penalty for this type of wire.

Wire variants can also be used in the delay estimation software to estimate the delay of long routes (e.g., routes of more than 24 tiles), which fall outside the table. However, it is difficult to accurately predict net delays under these circumstances without doing complex calculations and consuming large amounts of computer time and resources. Therefore, in one embodiment these delays are only approximated, using known techniques.

In another embodiment, the approach is taken of chaining together the longest resources on the PLD until the remaining ΔX and ΔY fall within the confines of the table. For example, for a Xilinx FPGA, a series of longs (interconnect lines 24 tiles long) is chained together in both the horizontal and vertical directions, until the remaining ΔX and ΔY fall within the table. At that point, the remaining delay is determined using the methods described above.

For estimating crossing penalties of these long routes, the entire route is created by pre-pending the longs to the route from the table, and then computing crossing penalties over the entire route.

Figure 5:
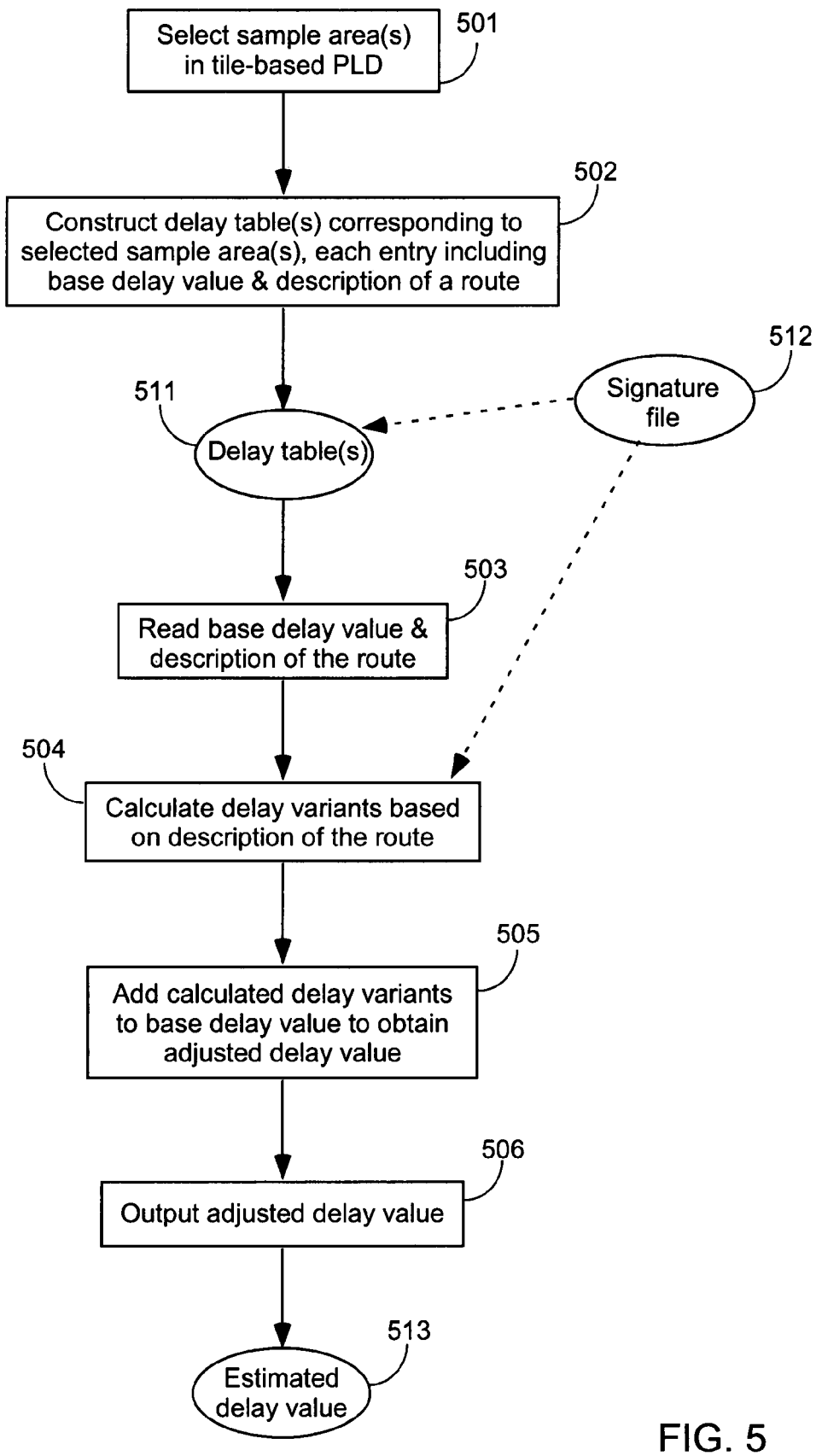
FIG. 5 illustrates the steps of an exemplary method of estimating a net delay in a tile-based PLD.

In summary of the methods described in detail above, FIG. 5 illustrates a series of steps that may be followed to estimate a net delay in a tile-based PLD, according to some embodiments of the present invention.

In step 501, one or more sample areas are selected from a tile-based PLD. In one embodiment, four representative sample areas are selected. The four sample areas may be located, for example, to the northwest, northeast, southwest, and southeast of a source tile (see FIG. 2, for example).

In step 502, one or more delay tables 511 are constructed, each corresponding to one of the sample areas from step 501. Each delay table includes delays from a source pin in the source tile to all supported destinations in the corresponding sample area. In one embodiment, four representative delay tables are generated, each representing one of the four sample areas, and each extending substantially in one of four orthogonal directions. The delay tables may be binary files, for example, as described above in connection with FIG. 2.

Steps 501 and 502 may be performed, for example, by the PLD software provider when the delay estimation software for the PLD is built. The delay tables may then be provided to the user along with the delay estimation software. The delay estimation software may be invoked, for example, by PLD implementation tools when the user is implementing the design. Thus, the remaining steps in FIG. 5 are typically performed as part of the PLD implementation process, e.g., when the router needs an estimate of a net delay in order to gauge the desirability of a particular route, the delay estimation software is called. The delay estimation software then performs steps 503-506.

In step 503, a delay table 511 is loaded into memory, and an entry is read from the table. For example, when four directional delay tables are provided for each source pin, as in the embodiment of FIG. 2, the delay table loaded into memory will be the directional table corresponding to the direction of the load pin relative to the source pin. Each entry in the delay table includes a corresponding base delay and a corresponding description of a route from a source pin in a source file to a load pin in the sample area, as described in connect with FIG. 2.

In step 504, delay variants are calculated based on the description of the route read from the delay table. For example, the delay variants may include pin delays and/or wire variants, as described above. For example, the delay variants may include either or both of a source pin delay and a load pin delay, and/or crossing penalties due to the presence of large or dense tiles along the path of the route. In some embodiments, crossing penalties may be read from a signature file 512 including the crossing penalties as part of the signature for each wire type. The signature file 512 may be provided, for example, by the PLD software provider with the delay estimation software. In other embodiments, the content of signature file 512 is included with the delay tables in a single file 511.

In step 505, the calculated delay variants are added to the base delay value read from the delay table to obtain an adjusted delay value. The adjusted delay value provides an estimate of the net delay between the source and load pins.

In step 506, the adjusted delay value is output as the estimated delay value 513, e.g., to the PLD implementation tool that called the timing estimation software, or by storing the adjusted net delay in a file or in memory. For example, if the router called the delay estimation tool, the adjusted net delay can be passed to the router in step 506.

The flowchart of FIG. 5 illustrates the architecture, functionality, and operation of possible implementations of methods, computer program products, and computer systems according to various embodiments of the present invention. In this regard, each block in the flowchart may represent a module, segment, or portion of code, which comprises one or more portions of computer-usable program code that implements the specified logical function(s).

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suitable. A typical combination of hardware and software can be a general-purpose computer system with a computer program that, when being loaded and executed, controls the computer system such that it carries out the methods described herein. The present invention also can be embedded in a computer program product, which comprises all the features enabling the implementation of the methods described herein, and which when loaded in a computer system is able to carry out these methods.

The term "software", in the present context, means any expression, in any language, code or notation, of a set of instructions intended to cause a system having an information processing capability to perform a particular function either directly or after either or both of the following: a) conversion to another language, code or notation; b) reproduction in a different material form. For example, a software program can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

This invention can be embodied in other forms without departing from the spirit or essential attributes thereof. Accordingly, reference should be made to the following claims, rather than to the foregoing specification, as indicating the scope of the invention.

What is claimed is:

1. A computer-implemented method, comprising:
   selecting a first sample area in a tile-based programmable logic device (PLD);
   constructing a first delay table corresponding to the first sample area, wherein each entry in the first delay table includes a corresponding base delay value and a corresponding description of a route from a source pin in a source tile to a load pin in the first sample area;
   reading the base delay value and the description of the route from the first delay table for a specified source pin in the source tile and the load pin in the first sample area;
   calculating one or more delay variants based on the description of the route read from the first delay table;
   adding the calculated delay variants to the base delay value read from the first delay table to obtain an adjusted delay value; and
   outputting the adjusted delay value,
   wherein the reading, calculating, adding, and outputting are performed by a computer.

2. The method of claim 1, wherein the one or more delay variants comprise pin delays.

3. The method of claim 1, wherein the one or more delay variants comprise crossing penalties.

4. The method of claim 1, further comprising:
   selecting one or more additional sample areas in the tile-based PLD; and
   constructing one or more additional delay tables, each of the additional delay tables corresponding to one of the one or more additional sample areas, wherein each entry in the additional delay tables includes a corresponding base delay value and a corresponding description of a route from a source pin in the source tile to a load pin in a corresponding sample area.

5. The method of claim 4, wherein the first sample area and the additional sample areas extend substantially in different directions from the source tile.

6. The method of claim 1, wherein the description of the route in the first delay table comprises a list of wires.

7. A computer program product, comprising:
   a computer-usable medium comprising computer-usable program code that, when executed by an information processing system, determines an estimated routing delay of a connection between a specified source pin and a specified load pin in a placement for a programmable logic device (PLD), the medium comprising:
   a first delay table corresponding to a first sample area of the PLD, wherein each entry in the first delay table includes a corresponding base delay value and a corresponding description of a route from a source pin in a source tile to a load pin in the first sample area;
   computer-usable program code for reading the base delay value and the description of the route from the first delay table for the specified source pin and the specified load pin;
   computer-usable program code for calculating one or more delay variants based on the description of the route read from the first delay table;
   computer-usable program code for adding the calculated delay variants to the base delay value read from the first delay table to obtain an adjusted delay value; and
   computer-usable program code for outputting the adjusted delay value.

8. The computer program product of claim 7, wherein the one or more delay variants comprise pin delays.

9. The computer program product of claim 7, wherein the one or more delay variants comprise wire variants.

10. The computer program product of claim 9, wherein the medium further comprises a signature file comprising crossing penalties to be included in the wire variants.

11. The computer program product of claim 7, wherein the medium further comprises:
    one or more additional delay tables, each of the additional delay tables corresponding to one of the one or more additional sample areas, wherein each entry in the additional delay tables includes a corresponding base delay value and a corresponding description of a route from a source pin in the source tile to a load pin in a corresponding sample area.

12. The computer program product of claim 11, wherein the first sample area and the additional sample areas extend substantially in different directions from the source tile.

13. The computer program product of claim 7, wherein the description of the route in the first delay table comprises a list of wires.

14. A computer system, comprising:
    a first delay table stored on the computer system, the first delay table corresponding to a first sample area in a tile-based programmable logic device (PLD), wherein each entry in the first delay table includes a corresponding base delay value and a corresponding description of a route from a source pin in a source tile to a load pin in the first sample area;
    a first module for reading the base delay value and the description of the route from the first delay table for a specified source pin in the source tile and the load pin in the first sample area;
    a second module for calculating one or more delay variants based on the description of the route read from the first delay table;
    a third module for adding the calculated delay variants to the base delay value read from the first delay table to obtain an adjusted delay value; and
    a fourth module for outputting the adjusted delay value,
    wherein the first, second, third, and fourth modules comprise modules stored on the computer system.

15. The computer system of claim 14, wherein the one or more delay variants comprise pin delays.

16. The computer system of claim 14, wherein the one or more delay variants comprise crossing penalties.

17. The computer system of claim 16, further comprising a signature file stored on the computer system, the signature file comprising crossing penalties to be included in the wire variants.

18. The computer system of claim 14, further comprising:
one or more additional delay tables stored on the computer system, each of the additional delay tables corresponding to one of the one or more additional sample areas, wherein each entry in the additional delay tables includes a corresponding base delay value and a corresponding description of a route from a source pin in the source tile to a load pin in a corresponding sample area.

19. The computer system of claim 18, wherein the first sample area and the additional sample areas extend substantially in different directions from the source tile.

20. The computer system of claim 14, wherein the description of the route in the first delay table comprises a list of wires.

* * * * *